United States Patent Office 3,060,231
Patented Oct. 23, 1962

3,060,231
PROCESS FOR THE MANUFACTURE OF N-CYCLO-
ALKYL SULFAMIC ACIDS
Paul Mueller and Robert Trefzer, Basel, Switzerland, assignors to Ciba Corporation, a corporation of Delaware
No Drawing. Filed Aug. 6, 1958, Ser. No. 753,429
Claims priority, application Switzerland Aug. 23, 1957
7 Claims. (Cl. 260—500)

This invention provides a new process for the manufacture of N-cycloalkyl sulfamic acids, especially of N-cyclohexyl sulfamic acid, by reaction of cycloalkyl amines with sulfamic acid and if desired conversion into corresponding salts.

The manufacture of N-cyclohexyl sulfamic acid by reaction of sulfamic acid with cyclohexylamine is described, for example, in British specification No. 662,800, published December 12, 1951, to Abbott Laboratories. The process concerned is, however, inadequate in various respects. Thus, for example, a reaction which is fairly satisfactory is achieved only at the relatively high temperatures of 180–185° C. The crude products thereby obtained in moderate yield are of poor quality and require a complicated additional purification e.g. by recrystallisation. Moreover working at temperatures of above 180° C. requires special apparatus and particular precautions.

This invention is based on the observation that the process can be essentially improved when the reaction of a cycloalkylamine, preferably with 4–7 ring carbon atoms, primarily cyclohexylamine or a cyclopentylamine, such as 3-methyl-cyclopentylamine, with sulfamic acid is carried out in the presence of a tertiary amine which is liquid at the reaction temperature, at a temperature below 160° C. The reaction is preferably conducted at 125–150° C., primarily at about 140° C., and/or at the reflux temperature of the reaction mixture. As tertiary amines that are liquid at the reaction temperature there are preferably used tertiary aliphatic, aliphatic-cycloaliphatic, aliphatic-aromatic, aliphatic-araliphatic or heterocyclic amines, primarily N:N-dimethylamino-cyclohexane or, for example, a mixture of β-picoline and γ-picoline. Also dialkylamino-alkanes especially di-lower alkyl amino alkanes, or ω,ω'-bis-dialkylamino-alkanes preferably ω,ω'-bis-di-lower alkylamino alkanes for example 1,6-bis-dimethyl-amino-hexane and 1,3-bis-dimethylaminopropane or tri-alkylamines especially tri-lower alkyl amines for example tri-n-propylamine or di-lower alkyl-benzyl amines, such as N:N-dimethyl-benzyl amine or dilower alkyl-phenyl amines such as N:N-dimethyl-aniline or mixtures of these tertiary amines may be used. A preferred embodiment of the process consists in that 1 mol of sulfamic acid is reacted with about 3 mols of cycloalkylamine in the presence of at least 2 mols, especially about 3 mols of tertiary amine. In this process the sulfamic acid is preferably introduced into a mixture of tertiary base and cycloalkyl-amine heated to the reaction temperature, for example to 140° C.

In operating according to the process of the invention, the corresponding molar quantity of ammonia is almost spontaneously liberated. Without tertiary amine, the splitting off of ammonia is considerably retarded and is not quantitative. In the presence of tertiary amine, however, a uniform and complete execution of the reaction is effected which can easily be controlled. Thus, a practically quantitative reaction of the sulfamic acid used with the cycloalkylamines is achieved, which essentially simplifies the working up of the reaction mixture. Thus the reaction product can be worked up without the hitherto necessary isolation of intermediate or crude products, for example the cyclohexyl-ammonium-N-cyclohexyl sulfamate, which is an essential technical simplification compared with earlier processes. For example, by the addition of caustic soda solution and driving off the organic bases with steam after elimination of small quantities of sulfate, the sodium salt of the N-cycloalkyl sulfamic acids can be obtained directly in pure form.

As above mentioned, the reaction mixture obtained in the process of the present invention can be worked up in a very simple manner, the excess of base mixture being recovered in the customary manner, for example by azeotropic drying and distillation. The said recovered mixture can be used again in further batches. In order to free the product produced from sulfate ions the following method is preferably used: An aqueous solution of an alkali salt of a cycloalkyl sulfamic acid is treated with a small excess of barium hydroxide, the difficulty soluble barium sulfate is separated off and from the sulfate-free filtrate the residual barium ions are precipitated with carbon dioxide in the pH region corresponding to weak alkalinity to mimosa. However, the sulfate-free filtrate can also be freed from residual barium ions by means of a cation exchange column charged with sodium ions with carboxylic acid operative groups, for example Amberlite IRC–50 (Na) using the elution method. N-cyclohexyl sulfamic acid can also be obtained in free form by treating the sulfate-free filtrate in a cation exchange column with sulfo acid active groups, e.g. Amberlite IR–120 (H) using the elution method.

The following examples illustrate the invention:

*Example 1*

382 grams (3 mols) of freshly distilled N:N-dimethyl-amino-cyclohexane and 298 grams (3 mols) of freshly distilled cyclohexylamine are mixed and maintained at 20–25° C. Then with exclusion of moisture heating is carried out to 140° C. and at this temperature, in the course of 4 hours, 97.1 grams (1 mol) of sulfamic acid are introduced with brisk stirring and stirring is continued for a further 2 hours at 140° C. After this time the evolution of ammonia is practically complete. The reaction product is cooled to 95° C., mixed with 600 cc. of water and 136 grams of 30% caustic soda solution and the excess bases are driven out of the resulting solution with steam. When the major quantity of base is distilled off, there are added for precipitation of small quantities of sulfate ions, 6.4 grams of crystalline barium hydroxide $Ba(OH)_2.8H_2O$ and distillation is continued until 100 cc. of distillate require less than 1 cc. of N-hydrochloric acid in order to turn the color of Methyl Red. The solution alkaline to mimosa obtained as distillation residue (about 1500 cc.) is stirred for 2 hours with water cooling (15° C.) and cleared with 4 grams of active charcoal. The sulfate-free filtrate, for removal of the residual barium ions is allowed to flow downwards through a cation exchange column of about 30 cc. of Amberlite IRC–50 (Na), which corresponds to about 20 cc. of Amberlite IRC–50 (H), followed by rinsing with 150 cc. of de-ionized water. Thereupon the eluate, which reacts weakly alkaline to mimosa, is evaporated to 450 grams under a pressure of 15 mm. of mercury and an internal temperature not exceeding 40° C. The crystal suspension produced is then dissolved by heating to 80° C., rendered weakly acid to litmus with glacial acetic acid and cleared with 2 grams of active charcoal. On slowly cooling to 10° C. the sodium salt of cyclohexyl sulfamic acid crystallizes from the filtrate in white platelets. These are filtered with suction and dried. The mother liquor is evaporated as above described to 80 grams and the resulting crystal suspension cooled to 10° C. and filtered with suction. The second crystallizate is introduced into the next batch for steam distillation prior to the addition of barium hydroxide. In this manner a yield of over 90% of the theoretical is obtained of pure sodium cyclohexyl sulfamate, calculated on the sulfamic acid used. Further working up of the combined mother liquors from the second crystallizate corresponding to the above directions by treatment with barium hydroxide and Amberlite IRC–50 (Na) and subsequent evaporation to the necessary concentration gives an increase of the yield by a further 5%.

It is also possible to operate in the following manner: The solution reacting alkaline to mimosa (about 1500 cc.) obtained as residue in the steam distillation of the above process, is cooled to 60° C. and cleared with 2 grams of active charcoal. For precipitation of the residual barium ions, carbon dioxide is introduced into the sulfate-free filtrate at 60° C. until a spot test on mimosa paper only gives a light orange. The turbid solution is then maintained for ½ hour at 60° C., stirred for 2 hours at 15° C. and cleared with 2 grams of active charcoal. Thereupon the filtrate is worked up as described above.

*Example 2*

A mixture of 280 grams of β-picoline and γ-picoline (B.P. 145° C.) and 298 grams (3 mols) of freshly distilled cyclohexylamine is heated to 138–140° C. with the exclusion of moisture and in the course of 4 hours at this temperature 97.1 grams (1 mol) of 100% sulfamic acid introduced with brisk stirring and the whole maintained with stirring for a further 5 hours at the same temperature. After this time the splitting off of ammonia is practically complete. The reaction product is cooled to 90° C. and treated with 600 cc. of water and 136 grams of 30% caustic soda solution. From the resulting solution the excess bases are driven off with steam and after the major quantity of base is distilled off there are added for precipitation of small quantities of sulfate ions 6.4 grams of crystalline barium hydroxide $Ba(OH)_2 \cdot 8H_2O$ and distillation continued until 100 cc. of distillate require less than 1 cc. of N-hydrochloric acid to turn the color of Methyl Red. The solution (about 1500 cc.) reaching alkaline to mimosa obtained as residue from the distillation can be worked up as described in Example 1. The yield of pure sodium cyclohexyl sulfamate amounts to more than 90% of the theoretical, calculated on sulfamic acid introduced.

The reaction products obtained in the above examples can be worked up also in the following manner: The hot reaction product is cooled to 90° C. and treated with 400 cc. of water and 393 grams of 10% milk of lime. From the resulting solution the excess bases are then driven off with steam until 100 cc. of distillate required less than 1 cc. of N-hydrochloric acid to turn the color of Methyl Red. The resulting distillation residue (about 1500 cc.) which is weakly alkaline to mimosa, is stirred for 2 hours with water cooling (15° C.) and cleared with 4 grams of active charcoal. The filtrate is then evaporated under 15 mm. pressure of mercury and at most 40° C. internal temperature to 430 grams, heated to 80° C. for dissolution of the resulting crystal suspension and again cleared with 4 grams of active charcoal. The filtrate is rendered weakly acid to litmus with about 0.2 cc. of glacial acetic acid and slowly cooled to 10° C. The calcium cyclohexyl sulfamate which has crystallized out in white phatelets is then filtered with suction and dried at 60° C. under 15 mm. presure of mercury. The mother liquors are again evaporated under 15 mm. pressure of mercury at an internal temperature of at most 40° to 70 grams, cooled to 10° C. and the resulting crystals filtered with suction. The second crystallizate is introduced into the next batch for steam distillation. The calcium cyclohexyl sulfamate dried at 60° C. under 15 mm. pressure contains two molecules of water of crystallization. The yield amounts to over 90% of the theoretical, calculated on sulfamic acid used.

*Example 3*

318.1 grams (2.5 mols) of freshly distilled N:N-dimethylamino-cyclohexane and 247.9 grams (2.5 mols) of freshly distilled cyclohexylamine are mixed at 20–25° C. The mixture is heated at 140° C. with the exclusion of moisture, and 97.1 grams (1 mol) of sulfamic acid are added at that temperature in the course of 4 hours with vigorous stirring. Stirring is continued for 2 hours at 140° C. After this time the evolution of ammonia is practically complete. The reaction product is cooled to 95° C., mixed with 600 cc. of water and 133.4 grams of sodium hydroxide solution of 30%, and the excess bases are expelled from the resulting solution with steam. For the purpose of further purification the solution obtained as distillation residue (about 1500 cc.) can be stirred vigorously with 200 cc. of distilled orthodichlorobenzene in two portions of 100 cc. each for ½ hour at a temperature not exceeding 95° C. The solvent extracts are separated each time. The remaining ortho-dichlorobenzene is expelled from the aqueous solution with steam. For the purpose of precipitating small quantities of sulfate ions 6.4 grams of crystalline barium hydroxide $Ba(OH)_2 \cdot 8H_2O$ are added and distillation is continued until 100 cc. of distillate require less than 1 cc. of N-hydrochloric acid to turn the color of Methyl Red. Working up is continued as described in Example 1. The yield of pure sodium cyclohexyl sulfamate is above 90% of the theoretical yield calculated on the sulfamic acid used as starting material.

N-cyclohexyl sulfamic acid can also be obtained in free form by letting the above sulfate-free filtrate run through a cation exchange column containing about 650 cc. of Amberlite IR–120 (H), and rinsing with 250 cc. of deionized water. The eluate which shows a reaction acid to Congo is immediately evaporated to dryness under reduced pressure at at most 10° C. internal temperature and there is obtained N-cyclohexyl sulfamic acid in the form of white platelets.

*Example 4*

38.2 grams (0.3 mol) of freshly distilled N:N-dimethylamino-cyclohexane and 29.8 grams (0.3 mol) of freshly distilled 3-methyl-cyclopentylamine are mixed at 20–25° C. The mixture is heated at 136° C. with the exclusion of moisture, 9.7 grams (0.1 mol) of sulfamic acid are added at 136–140° C. in the course of 4 hours with vigorous stirring. Stirring is continued at 140° C. for 2 hours. After this time the evolution of ammonia is practically complete. Working up can be carried out as described in any one of the preceding examples. A yield is obtained of over 90% of the theoretical yield of pure sodium- or calcium-N-(3-methyl-cyclopentyl)-sulfamate calculated on the sulfamic acid used as starting material.

*Example 5*

129.2 grams (0.72 mol) of freshly distilled 100% pure 1:6-bis-dimethylamino-hexane and 148.8 grams (1.5 mols) of freshly distilled 100% pure cyclohexylamine are mixed at 20–25° C. The mixture is heated at 138–140° C. with the exclusion of moisture, and 48.6 grams (0.5 mol) of 100% pure sulfamic acid are introduced at that temperature in the course of 4 hours with vigorous stirring. The whole is then stirred for 2 hours at 140° C. After this time the evolution of ammonia is practically complete. The reaction product is cooled to 95° C., mixed with 200 ml. of water and 66.7 grams of sodium hydroxide solution of 30% strength, and the excess bases are expelled from the resulting solution with steam. The product can be worked up as described in Example 1, 2 or 3.

The yield of pure sodium cyclohexyl-sulfamate is above 90% of the theoretical yield calculated on sulfamic acid used as starting material.

*Example 6*

215.0 grams (1.5 mols) of freshly distilled 100% pure tri-n-propylamine and 148.8 grams (1.5 mols) of freshly distilled 100% pure cyclohexylamine are mixed at 20-25° C. The mixture is heated at 140° C. with the exclusion of moisture, and 48.6 grams (0.5 mol) of sulfamic acid of 100% strength are introduced at that temperature in the course of 6 hours with vigorous stirring. Stirring is continued for 8 hours at 140-145° C. After this time the evolution of ammonia is practically complete. The reaction product is cooled to 95° C., mixed with 200 ml. of water and 66.7 grams of sodium hydroxide solution of 30% strength, and the excess bases are expelled from the resulting solution with steam. The product can be worked up as described in Example 1, 2 or 3.

The yield of pure sodium cyclohexyl sulfamate is above 90% of the theoretical yield calculated on the sulfamic acid used as starting material.

*Example 7*

202.8 grams (1.5 mols) of freshly distilled 100% pure N:N-dimethyl benzyl amine nad 148.8 grams (1.5 mols) of freshly distilled 100% pure cyclohexylamine are mixed at 20-25° C. The mixture is heated at 140° C. with the exclusion of moisture, nad 48.6 grams (0.5 mols) of sulfamic acid of 100% strength are introduced at that temperature in the course of 6 hours with vigorous stirring. Stirring is continued for 1 hour at 140° C. After this time the evolution of ammonia is practically finished. The reaction product is cooled to 95° C., mixed with 200 ml. of water and 66.7 grams of sodium hydroxide solution of 30% strength, and the excess bases are expelled from the resulting solution with steam. The product can be worked up as described in Example 1, 2 or 3.

The yield of pure sodium cyclohexyl sulfamate is higher than 90% of the theoretical yield calculated on the sulfamic acid used as starting material.

*Example 8*

363.6 grams (3 mols) of freshly distilled N:N-di methylaniline and 297.6 grams (3 mols) of freshly distilled cyclohexylamine are mixed at 20-25° C. The mixture is heated at 140° C. with the exclusion of moisture, and 97.1 grams (1 mol) of sulfamic acid of 100% strength are introduced at that temperature in the course of 5 hours with vigorous stirring. The whole is then stirred for 4 hours at 140-144° C. After this time the evolution of ammonia is practically complete. The reaction product is cooled to 95° C., mixed with 600 cc. of water and 133.4 grams of sodium hydroxide solution of 30% strength, and the excess bases are expelled from the resulting solution with steam. The product can be worked up as described in any one of the preceding examples.

The yield of pure sodium cyclohexyl-sulfamate is above 90% of the theoretical yield calculated on sulfamic acid used as starting material.

What is claimed is:

1. In a process for the manufacture of N-cycloalkyl sulfamic acids by reacting primary cycloalkylamines with sulfamic acid and conversion into their salts, said salts being selected from the group consisting of sodium and calcium salts, the step of reacting at 125 to below 160° C. a primary cycloalkylamine having 4 to 7 ring carbon members with sulfamic acid in the presence of an N,N'-di-lower alkyl-amino-alkane which is liquid at the reaction temperature, the sulfamic acid being added to the mixture of cycloalkylamine and said tertiary amine preheated to the reaction temperature and the mol ratio of the components in the reaction medium being 1 mol sulfamic acid to 2-3 mols of cycloalkylamine and 2-3 mols of tertiary amine.

2. In a process for the manufacture of N-cycloalkyl sulfamic acids by reacting primary cycloalkylamines with sulfamic acid and conversion into their salts, said salts being selected from the group consisting of sodium and calcium salts, the step of reacting at 125 to below 160° C. a primary cycloalkylamine having 4 to 7 ring carbon members with sulfamic acid in the presence of a member selected from the group consisting of N,N'-di-lower alkyl-amino-benzene, N,N'-di-lower alkyl-amino-hexane, N,N'-di-lower alkyl-benzylamine and a mixture of β-picoline and γ-picoline which is liquid at the reaction temperature, the sulfamic acid being added to the mixture of cycloalkylamine and tertiary amine preheated to the reaction temperature and the mol ratio of the components in the reaction medium being 1 mol sulfamic acid to 2-3 mols of cycloalkylamine and 2-3 mols of tertiary amine.

3. In a process for the manufacture of N-cycloalkyl sulfamic acids by reacting primary cycloalkylamines with sulfamic acid and conversion into their salts, said salts being selected from the group consisting of sodium and calcium salts, the step of reacting at about 140° C., a primary cycloalkylamine having 4 to 7 ring carbon members with sulfamic acid in the presence of a member selected from the group consisting of N,N'-di-lower alkyl-aminobenzene, N,N'-di-lower alkyl-amino-hexane, N,N'-di-lower alkylbenzylamine and a mixture of β-picoline and γ-picoline which is liquid at the reaction temperature, the sulfamic acid being added to the mixture of cycloalkylamine and tertiary amine preheated to the reaction temperature and the mol ratio of the components in the reaction medium being 1 mol sulfamic acid to 2-3 mols of cycloalkylamine and 2-3 mols of tertiary amine.

4. In a process for the manufacture of N-cycloalkyl sulfamic acids by reacting primary cycloalkylamines with sulfamic acid and conversion into their salts, said salts being selected from the group consisting of sodium and calcium salts, the step of reacting at 125 to below 160° C., a primary cycloalkylamine having 4 to 7 ring carbon members with sulfamic acid in the presence of N:N-dimethylamino-cyclohexane, the sulfamic acid being added to the mixture of cycloalkylamine and said tertiary amine preheated to the reaction temperature and the mol ratio of the components in the reaction medium being 1 mol sulfamic acid to 2-3 mols of cycloalkylamine and 2-3 mols of tertiary amine.

5. In a process for the manufacture of N-cycloalkyl sulfamic acids by reacting primary cycloalkylamines with sulfamic acid and conversion into their salts, said salts being selected from the group consisting of sodium and calcium salts, the step of reacting at 125 to below 160° C., a primary cycloalkylamine having 4 to 7 ring carbon members with sulfamic acid in the presence of a mixture of β-picoline and γ-picoline, the sulfamic acid being added to the mixture of cycloalkylamine and tertiary amine preheated to the reaction temperature and the mol ratio of the components in the reaction medium being 1 mol sulfamic acid to 2-3 mols of cycloalkylamine and 2-3 mols of tertiary amine.

6. In a process for the manufacture of N-cycloalkyl sulfamic acids by reacting primary cycloalkylamines with sulfamic acid and conversion into their salts, said salts being selected from the group consisting of sodium and calcium salts, the step of reacting at 125 to below 160° C., a primary cycloalkylamine having 4 to 7 ring carbon members with sulfamic acid in the presence of 1,6-bisdimethylaminohexane, the sulfamic acid being added to the mixture of cycloalkylamine and said tertiary amine preheated to the reaction temperature and the mol ratio of the components in the reaction medium being 1 mol sulfamic acid to 2–3 mols of cycloalkylamine and 2–3 mols of tertiary amine.

7. In a process for the manufacture of N-cycloalkyl sulfamic acids by reacting primary cycloalkylamines with sulfamic acid and conversion into their salts, said salts being selected from the group consisting of sodium and calcium salts the step of reacting at 125 to below 160° C., a primary cycloalkylamine having 4 to 7 ring carbon members with sulfamic acid in the presence of N:N-dimethyl benzyl amine, the sulfamic acid being added to the mixture of cycloalkylamine and said tertiary amine preheated to the reaction temperature and the mol ratio of the components in the reaction medium being 1 mol sulfamic acid to 2–3 mols of cycloalkylamine and 2–3 mols of tertiary amine.

References Cited in the file of this patent

UNITED STATES PATENTS 2,814,640    Golding _____ Nov. 26, 1957

OTHER REFERENCES

Samuelson: Ion Exchangers in Analytical Chemistry (1953), p. 87 relied on. (Copy in Library.)